(12) United States Patent
Petersen

(10) Patent No.: US 11,125,523 B2
(45) Date of Patent: Sep. 21, 2021

(54) 3-D PRINTABLE MULTI-BAFFLED FIREARM SUPPRESSOR

(71) Applicant: DELTA P DESIGN, INC., Walterville, OR (US)

(72) Inventor: Byron S. Petersen, Springfield, OR (US)

(73) Assignee: Delta P Design, Inc., Walterville, OR (US)

( * ) Notice: Subject to any disclaimer, the term of this patent is extended or adjusted under 35 U.S.C. 154(b) by 190 days.

(21) Appl. No.: 16/199,796

(22) Filed: Nov. 26, 2018

(65) Prior Publication Data

US 2020/0025491 A1 Jan. 23, 2020

Related U.S. Application Data

(60) Provisional application No. 62/591,672, filed on Nov. 28, 2017.

(51) Int. Cl.
*F41A 21/30* (2006.01)

(52) U.S. Cl.
CPC .................. *F41A 21/30* (2013.01)

(58) Field of Classification Search
CPC .......... F41A 21/30; F41A 21/32; F41A 21/44; F41A 21/325; F41A 21/36; F41A 21/34
See application file for complete search history.

(56) References Cited

U.S. PATENT DOCUMENTS

| 6,575,074 | B1 * | 6/2003 | Gaddini | F41A 21/30 |
| | | | | 89/14.4 |
| 7,987,944 | B1 * | 8/2011 | Brittingham | F41A 21/30 |
| | | | | 181/223 |
| 8,844,422 | B1 * | 9/2014 | Klett | F41A 21/30 |
| | | | | 89/14.2 |
| 9,347,727 | B1 * | 5/2016 | Cler | F41A 21/30 |
| 9,739,559 | B2 * | 8/2017 | Bush | F41A 21/30 |
| 9,746,267 | B2 * | 8/2017 | Smith | F41A 21/30 |
| D808,490 | S * | 1/2018 | Meinert | D22/108 |
| 9,982,959 | B2 * | 5/2018 | Washburn, III | F41A 21/30 |
| 10,119,779 | B1 * | 11/2018 | Miele | F41A 21/30 |
| 10,126,084 | B1 * | 11/2018 | Oglesby | F41A 21/30 |
| 10,371,476 | B1 * | 8/2019 | Oglesby | F41A 21/30 |
| 10,458,739 | B2 * | 10/2019 | Smith | F41A 21/30 |
| 10,634,445 | B1 * | 4/2020 | Klett | F41A 21/34 |
| 2011/0186377 | A1 * | 8/2011 | Kline | F41A 21/30 |
| | | | | 181/223 |
| 2013/0180796 | A1 * | 7/2013 | Dueck | F41A 21/325 |
| | | | | 181/223 |
| 2015/0101882 | A1 * | 4/2015 | Moss | F41A 21/30 |
| | | | | 181/223 |
| 2015/0276340 | A1 | 10/2015 | Vais | |

(Continued)

FOREIGN PATENT DOCUMENTS

| CA | 3012123 A1 * | 9/2017 | ............. F41A 21/30 |
| EP | 2325594 A2 * | 5/2011 | ............. F41A 21/30 |

*Primary Examiner* — Benjamin P Lee
(74) *Attorney, Agent, or Firm* — McCoy Russell LLP

(57) ABSTRACT

Methods and systems are provided for a sound suppressor adapted to be operable with all manners of firearm, including autoloading firearms. In one example, a sound suppressor comprises a unitary single-piece body configured with centrally aligned baffle chambers circumferentially surrounded by exhaust gas chambers.

19 Claims, 9 Drawing Sheets

(56) References Cited

U.S. PATENT DOCUMENTS

| | | | | |
|---|---|---|---|---|
| 2015/0362276 | A1* | 12/2015 | Fischer | F41G 11/003 89/14.4 |
| 2016/0209149 | A1* | 7/2016 | Fischer | F41A 21/30 |
| 2017/0160034 | A1* | 6/2017 | Parker | F41A 21/30 |
| 2017/0205174 | A1* | 7/2017 | Petersen | F41A 21/30 |
| 2017/0254609 | A1 | 9/2017 | Schoenlau | |
| 2017/0321985 | A1* | 11/2017 | Bray | F41A 21/34 |
| 2018/0031346 | A1* | 2/2018 | Washburn, III | F41A 21/30 |
| 2018/0202744 | A1* | 7/2018 | De Sousa | F41A 21/30 |
| 2018/0283822 | A1* | 10/2018 | Johansen | F41A 21/30 |
| 2018/0292160 | A1* | 10/2018 | Petersen | F41A 21/30 |
| 2018/0313624 | A1* | 11/2018 | Smith | F41A 21/30 |
| 2019/0186860 | A1* | 6/2019 | Ellison | F41A 21/30 |
| 2019/0242667 | A1* | 8/2019 | Lo | F41A 21/30 |

* cited by examiner

3-D PRINTABLE MULTI-BAFFLED FIREARM SUPPRESSOR

CROSS REFERENCE TO RELATED APPLICATIONS

The present application claims priority to U.S. Provisional Application No. 62/591,672, entitled "3-D PRINTABLE MULTI-BAFFLED FIREARM SUPPRESSOR", and filed on Nov. 28, 2017. The entire contents of the above-listed application are hereby incorporated by reference for all purposes.

FIELD

The present description relates generally to methods and systems for firearm sounds suppressors employing a plurality of baffles.

BACKGROUND AND SUMMARY

Firearms utilize high pressure exhaust gases to accelerate a projectile such as a bullet. Firearm silencers (hereafter referred to as "suppressors") are typically added to the muzzle (exhaust) of a firearm to capture the high pressure exhaust gases of a given firearm. These high pressure exhaust gases are the product of burning nitrocellulose and possess significant energy that is used to accelerate the projectile. The typical exhaust gas pressure of a rifle cartridge in a full length barrel may be in the range of 7-10 Ksi whereas a short barreled rifle may have exhaust gas pressures in the 10-20 Ksi range. Moving at supersonic speeds through the bore, the exhaust gases provide the energy to launch the projectile but also result in generation of high-decibel noises upon firearm discharge. When coupled to the firearm, firearm suppressors lower the kinetic energy and pressure of the propellant gases and thereby reduce the decibel level of the resultant noises.

Firearm suppressors are mechanical pressure reduction devices that contain a center through-hole to allow passage of the projectile. Suppressor design(s) utilize static geometry to induce pressure loss across the device by means including rapid expansion and contraction, minor losses related to inlet and outlet geometry, and induced pressure differential to divert linear flow.

Suppressors can be thought of as "in-line" pressure reduction devices that capture and release the high pressure gases over a time (T). Typical suppressor design approaches used to optimize firearm noise reduction include maximizing internal volume, and providing a baffled or "tortured" pathway for propellant gas egress. Each of these approaches must be balanced against the need for clear egress of the projectile, market demand for small overall suppressor size, adverse impacts on the firearm performance, adverse impacts on the operator, and constraints related to the firearm original mechanical design.

Baffle structures within a suppressor provide the "tortured" pathways which act to restrain the flow of propellant gases and thereby reduce the energy signature of said gases. As a result of this function the baffle structures in a suppressor are typically the portion of a suppressor that absorbs the most heat from propellant gases during firing. The "mirage" effect is distortion of the sight picture caused by hot air rising off of the hot suppressor directly in front of the aiming optic on the firearm. The "mirage" effect is a well-known negative aspect of using a suppressor with a firearm, and is often mitigated by wrapping the suppressor in an insulating wrap.

Suppressors may be coupled to autoloading firearms, both semi-automatic and automatic, which are configured to utilize a portion of the waste exhaust gases to operate the mechanical action of the firearm. When in operation the mechanical action of the firearm automatically ejects the spent cartridge case and emplaces a new cartridge case into the chamber of the firearm barrel. One typical autoloading design traps and utilizes exhaust gases from a point along the firearm barrel. The trapped gases provide pressure against the face of a piston, which in turn triggers the mechanical autoloading action of the firearm. The energy of the trapped exhaust gases supplies the work required to operate the mechanical piston of the firearm enabling rapid cycling of cartridges.

The inventor herein has recognized significant issues, such as the "mirage" effect, related to excess heat build-up that may arise due to the use of a suppressor on a firearm. In the present disclosure, a plurality of exhaust gas chambers, each of which reside in their own internal tube, are employed to reduce the pressure of the propellant gases. To mitigate the issues related to excess heat build-up the exhaust gas chambers are positioned such that the tubes are not tangent with (touching) the outer wall or each other. The plurality of exhaust gas chambers are instead arranged around a central set of baffle chambers through which the projectile pathway extends.

The inventors herein have recognized that this positioning maximizes the surface area of the plurality of exhaust gas chambers inside the suppressor body to maximize thermal transmission between the hot exhaust gases and the suppressor body. This positioning further helps to more evenly distribute the heat energy of the hot exhaust gases to the interior structures of the suppressor body such that "hot spots" are minimized. In addition, the positioning minimizes the thermal transmission between the internal exhaust gas chambers and the outer wall; a lumen defined by the area between the inner surface of the suppressors' outer wall and the outer walls of the baffled exhaust gas tubes creates a thermal buffer. As a result, thermal transmission from the high heat area of the baffled exhaust tubes to the outside wall is minimized. By delaying the heating of the suppressors' outer wall, the "mirage" effect to the shooter is delayed, allowing the operator to shoot more cartridges before the "mirage" effect occludes the view through the optic.

The inventors herein have also recognized significant issues arising when suppressors are employed on autoloading firearms. As an example, use of a suppressor may result in sustained elevated internal pressures which result in transmission of excess work energy to the piston during the course of operation. When use of the suppressor results in such a build-up of pressure in the firearm chamber over an extended time (T), the excess work energy may lead to opening of the breech (chamber) sooner than is supported by the original firearm design. Therefore, as recognized by the inventors herein, overcoming this issue requires achieving the desired pressure loss ($\Delta P$) over an abbreviated time (T) such that the internal pressure returns below the pressure threshold of the piston before firing of the subsequent cartridge. As a second example, use of the suppressor on autoloading firearms may result in excess venting of exhaust gases at the rear of the weapon in the direction of the operator. Excess venting of exhaust gases at the rear of the weapon is undesirable as the gases may contain toxic substances, and the particulate matter in the gases may foul the weapons chamber.

Furthermore, the successive firing enabled by autoloading weapons may decrease the effective lifetime of the suppressor. Frequent use of an autoloading weapon with the suppressor may result in a greater requirement for replacement of the suppressor, thereby burdening the operator with increased expense.

In one embodiment, the issues described above may be addressed by a suppressor comprising a geometric baffle system and further comprising an auxiliary system of a plurality of exhaust gas chambers that may achieve the desired pressure loss ($\Delta P$) over an abbreviated time period ($\Delta T$). The suppressor may be adapted for 3D printing by configuring the baffle system and plurality of exhaust gas chambers to be generated as a single unit enclosed within a sealed outer tube. In another embodiment, the issues described above may be addressed by a suppressor comprising a plurality of exhaust vents that efficiently direct the exhaust gases outward through the front of the suppressor and away from the operator and the firearm. By reducing the time required for the internal pressure of suppressor, chamber, and barrel to return to ambient pressure conditions, by time Tx, mechanical malfunction of the autoloading mechanism may be avoided. Further, reducing the internal pressure in the suppressor over an abbreviated time period reduces the pressure inside the barrel and chamber, thereby eliminating excess venting of exhaust gases at the rear of the firearm in the direction of the operator.

The auxiliary exhaust gas chambers may exit in any direction. Venting through the front of the suppressor was chosen as a direction opposite the operator to minimize exposure of the operator to exhaust gases. However, in other examples, other directions for exhaust gas release may be considered. For example, it may be desirable to have the exhaust gases exit out of the side of the suppressor or on only one side to minimize exhaust gas occluding sensors on remote weapon platforms.

In this way, the firearm suppressor may be operable on any type of autoloading firearm, including but not limited to machine gun applications, without adversely affecting mechanical operations according to the original firearm design. Further, the firearm suppressor may be operable without adversely impacting the safety or performance of the operator. The utility of the suppressor may therefore be extended and more fully realized. In addition, the suppressor may be replaced by 3-D printed, low-cost units that produced at lower cost due to efficient scalable manufacturing. Other elements of the disclosed embodiments of the present subject matter are provided in detail herein.

In another embodiment, the suppressor may be operatively configured to be attached to a firearm. The suppressor may include a tubular housing body defining a longitudinal or central axis, wherein the baffle sections and further wherein the spiral fluting sections and further wherein the auxiliary system of baffled exhaust gas tubes of the suppressor are integrated and encased within a parent tubular housing component. In this way, the interior baffle section(s) may be surrounded by a housing such that the efficiency and efficacy of the suppressor are maintained.

The tubular housing body may further comprise a projectile entrance portion and a projectile exit portion disposed at a longitudinally rearward region and a longitudinally forward region, respectively. The rearward end of the suppressor may have an opening sufficiently large enough to permit passage of at least a portion of a firearm barrel, where the suppressor may attach via connectable interaction devices such as interlacing threads.

It should be understood that the summary above is provided to introduce in simplified form, a selection of concepts that are further described in the detailed description. It is not meant to identify key or essential features of the subject matter. Furthermore, the disclosed subject matter is not limited to implementations that solve any disadvantages noted above or in any part of this disclosure.

BRIEF DESCRIPTION OF THE DRAWINGS

FIGS. 1-9 are drawn to scale, although other relative dimensions may be used, if desired. The drawings may depict components directly touching one another and in direct contact with one another and/or adjacent to one another, although such positional relationships may be modified, if desired. Further, the drawings may show components spaced away from one another without intervening components there between, although such relationships again, could be modified, if desired.

DETAILED DESCRIPTION

An example multi-baffled firearm suppressor is described herein. The following description relates to various embodiments of the sound suppressor as well as methods of manufacturing and using the device. Potential advantages of one or more of the example approaches described herein relate to reducing a time required for the suppressor to return to ambient pressure without adversely impacting performance of the firearm, reducing a mirage effect, improving thermal signature reduction characteristics, improving operating performance with autoloading firearms, reducing the sound signature from the firearm, eliminating rearward venting of exhaust gases during use with semi-automatic weapon, and various other advantages as explained herein.

Figure 1:
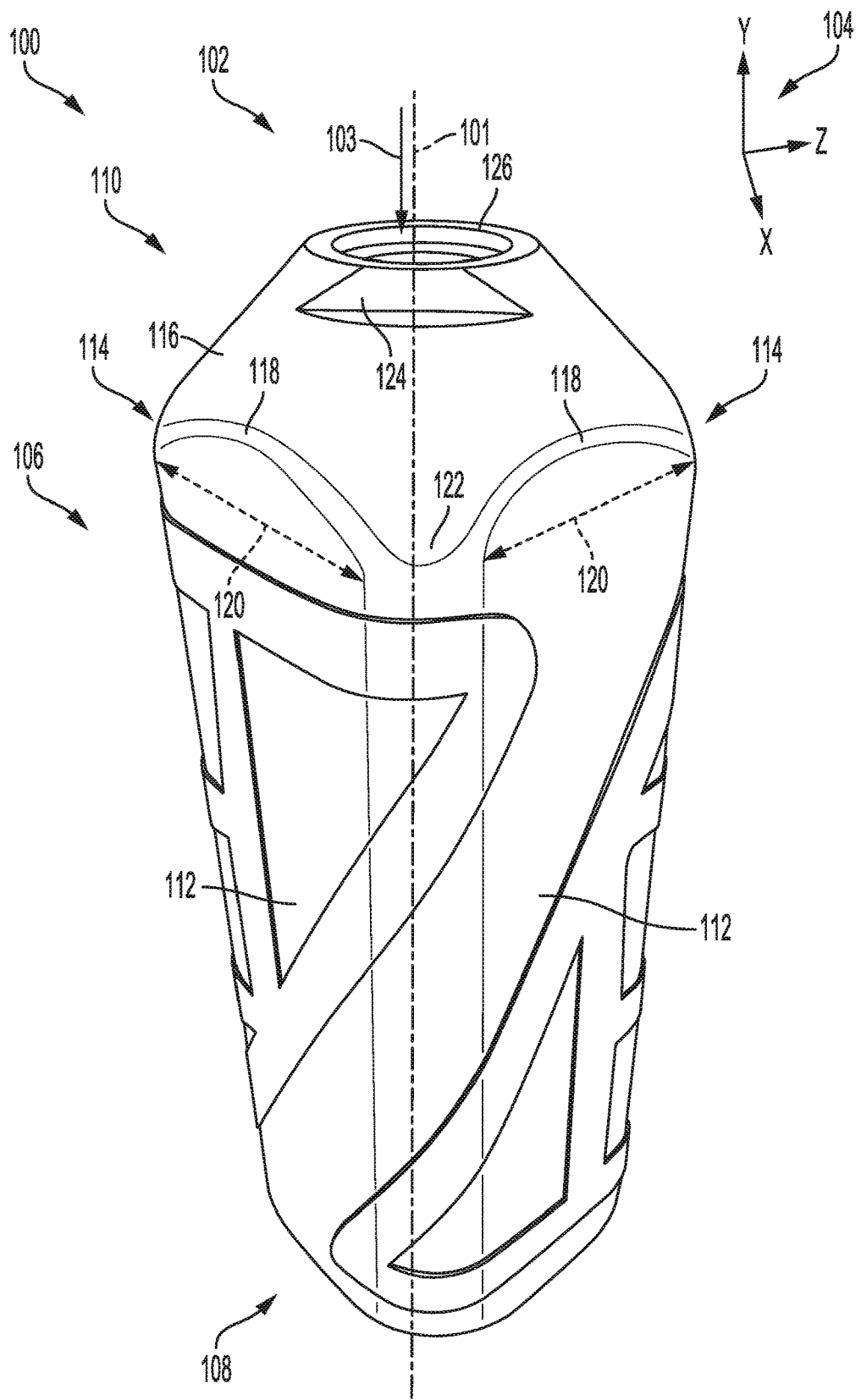
FIG. 1 shows a first isometric perspective view of an example suppressor in a first position.
Figure 2:
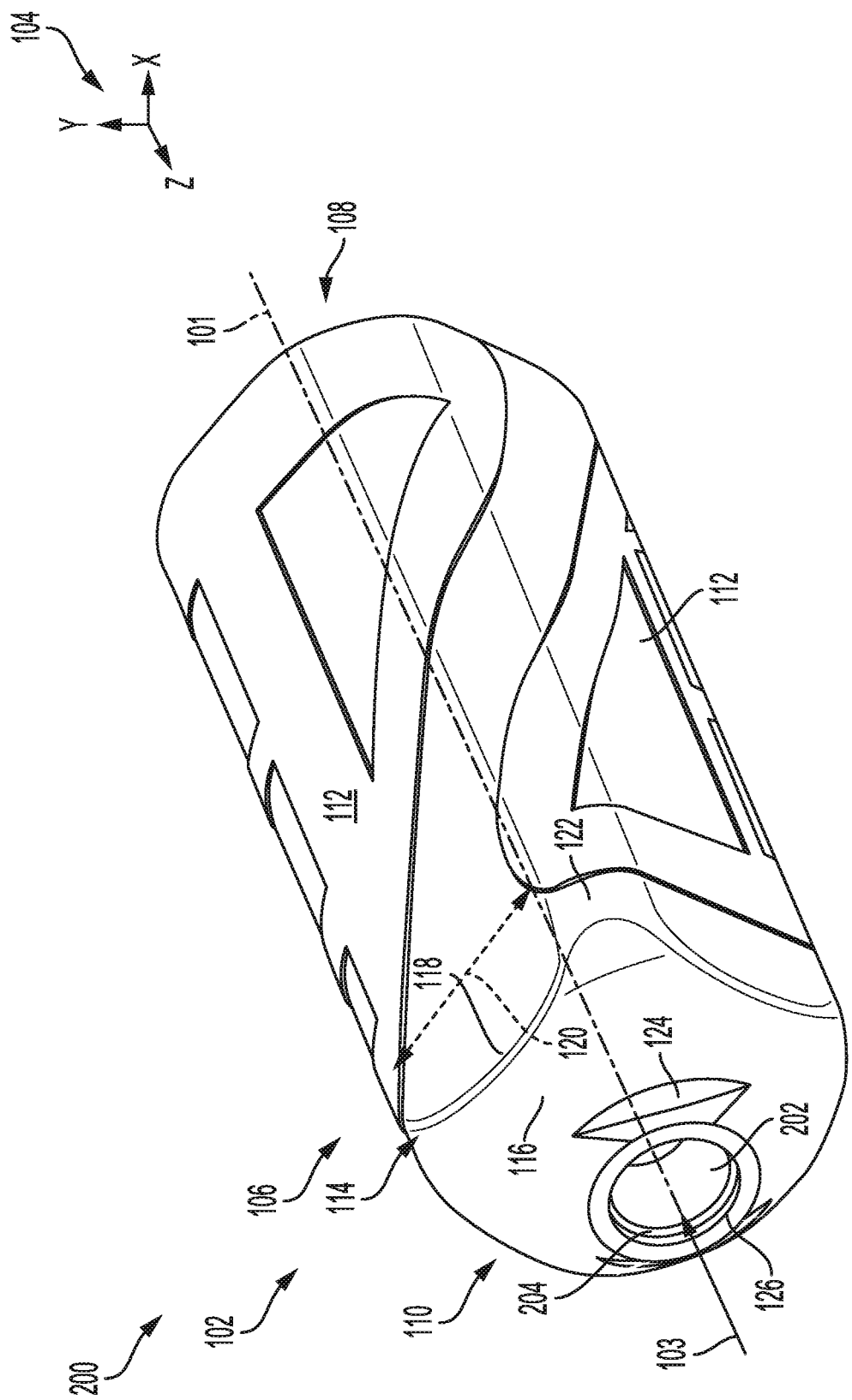
FIG. 2 shows a second isometric perspective view of the example suppressor in a second position.
Figure 5:
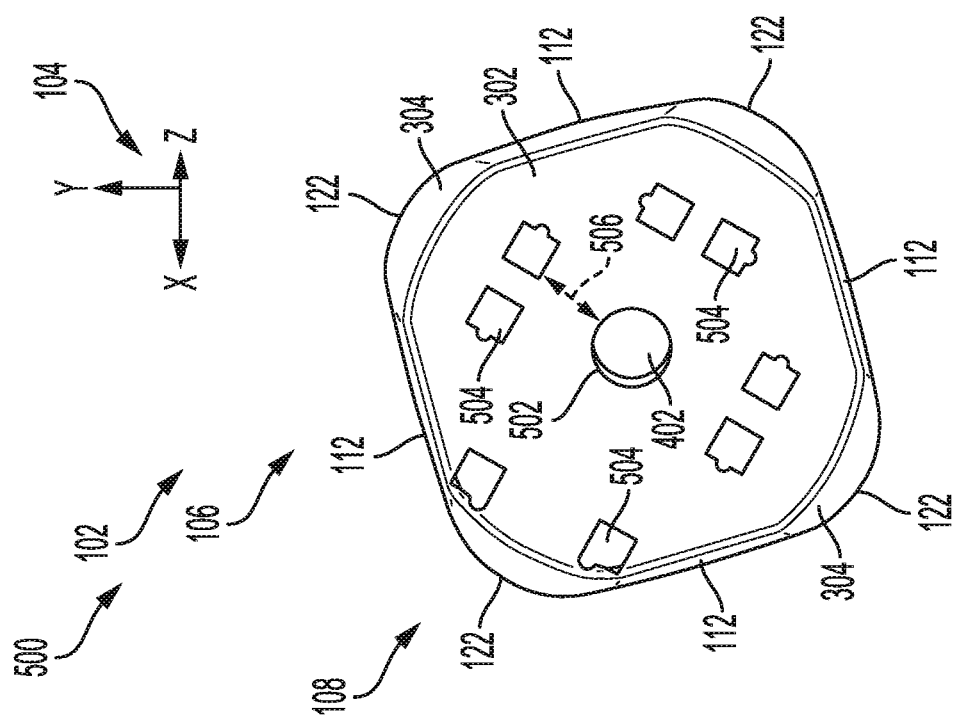
FIG. 5 shows the example suppressor from a view of a second end of the suppressor.
Figure 6:
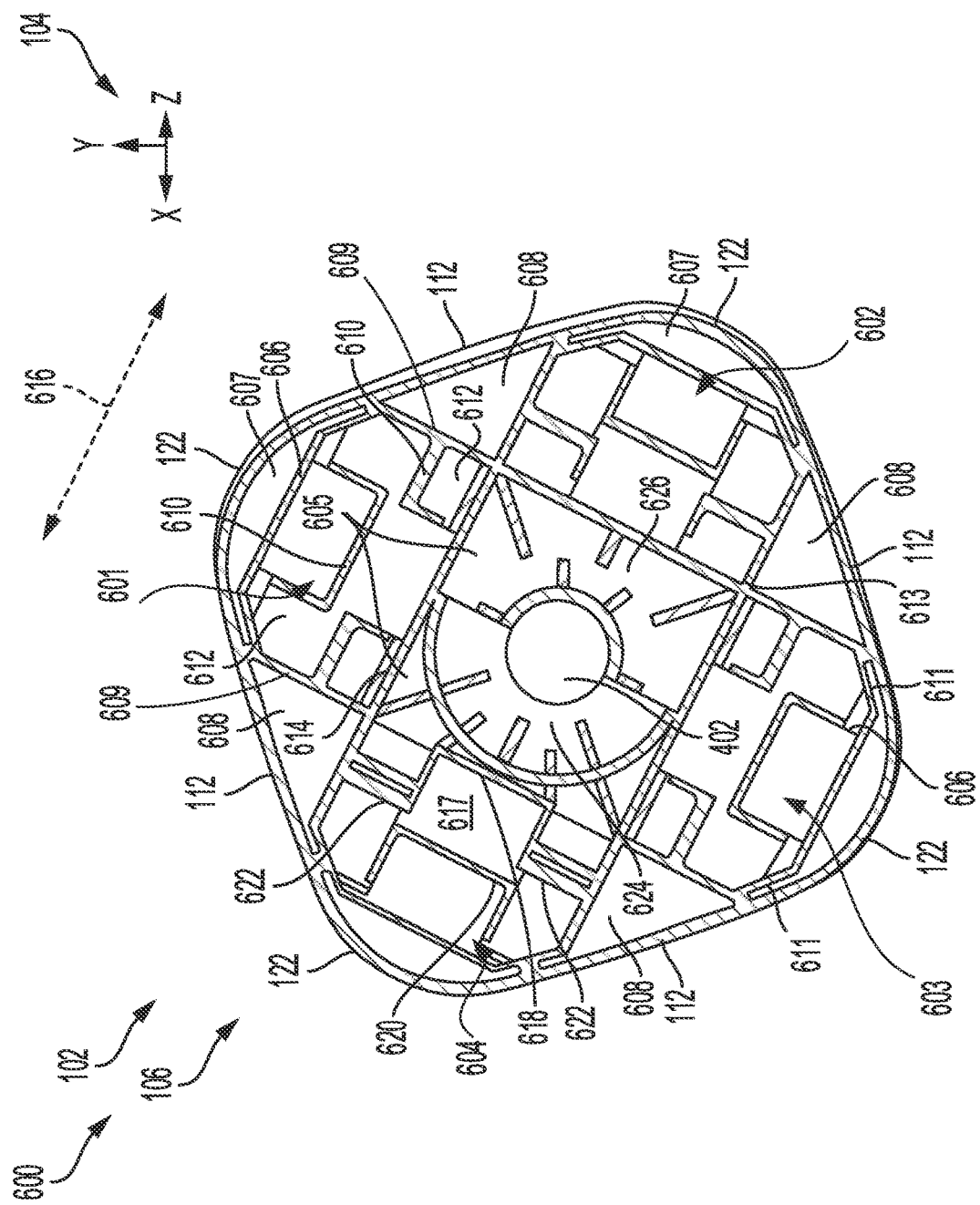
FIG. 6 shows a first cross-section of the example suppressor.
Figure 7:
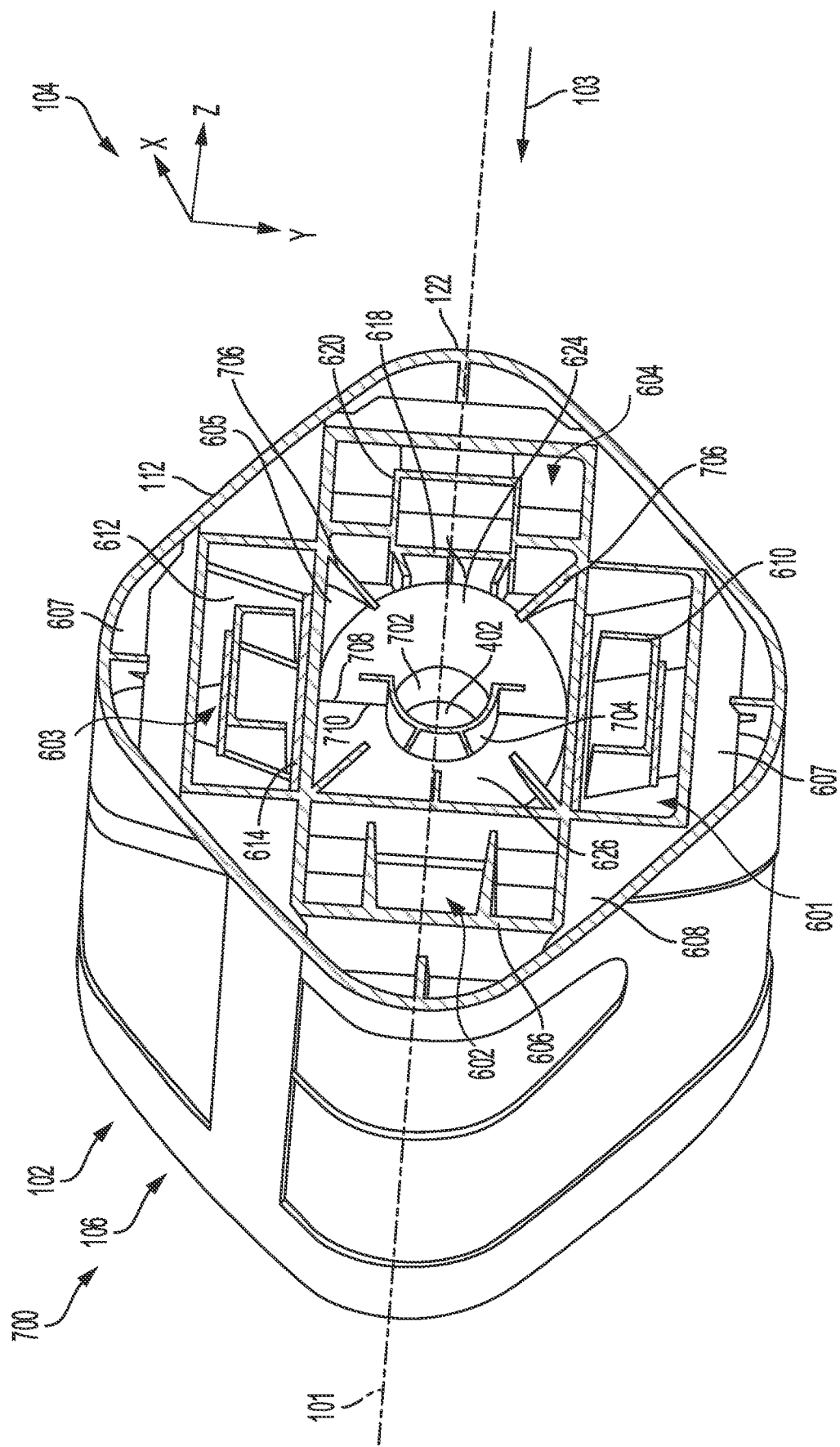
FIG. 7 shows an isometric perspective view of the first cross-section of the example suppressor.
Figure 8:
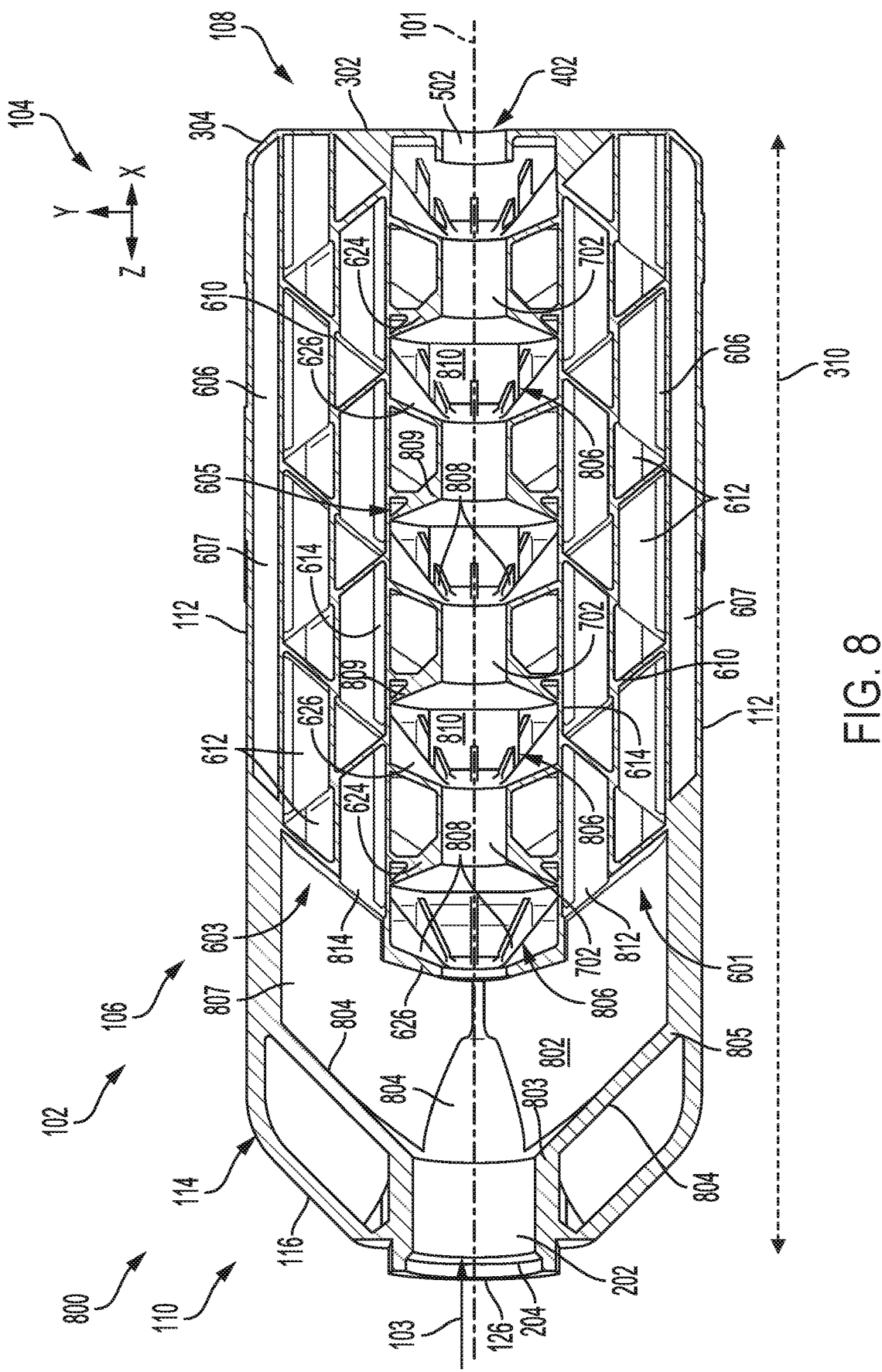
FIG. 8 shows a second cross-section of the example suppressor.

An exemplary suppressor is shown at FIG. 1, in a first, upright position comprising a sealed continuous outer housing without seams. An isometric view of the suppressor is shown at FIG. 2 from a different perspective than at FIG. 1, depicting the suppressor oriented in a second, horizontal position, relative to FIG. 1. The suppressor is viewed from the side at FIG. 3, from a first, upstream end at FIG. 4, showing an inlet for a projectile, and from a second, downstream end at FIG. 5, showing an outlet for the projectile. A first cross-section of the suppressor is depicted at FIG. 6, cut perpendicular to a central axis of the suppressor. An isometric view of the cross-section at FIG. 6 is shown at FIG. 7. A second cross-section of the suppressor, cut along the central axis of the suppressor, is shown at FIG. 8, and illustrated from an isometric perspective view at FIG. 9. A coupling of a suppressor to a firearm is shown in a schematic diagram in FIG. 10.

Further, FIGS. 1-9 show the relative positioning of various components of the suppressor assembly. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space there-between and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being triangular, helical, straight, planar, curved, rounded, spiral, angled, or the like). Further, elements shown intersecting one another may be referred to as intersecting elements or intersecting one another, in at least one example. Further still, an element shown within another element or shown outside of another element may be referred as such, in one example. For purpose of discussion, FIGS. 1-9 will be described collectively and elements in common will be numbered similarly.

Figure 10:
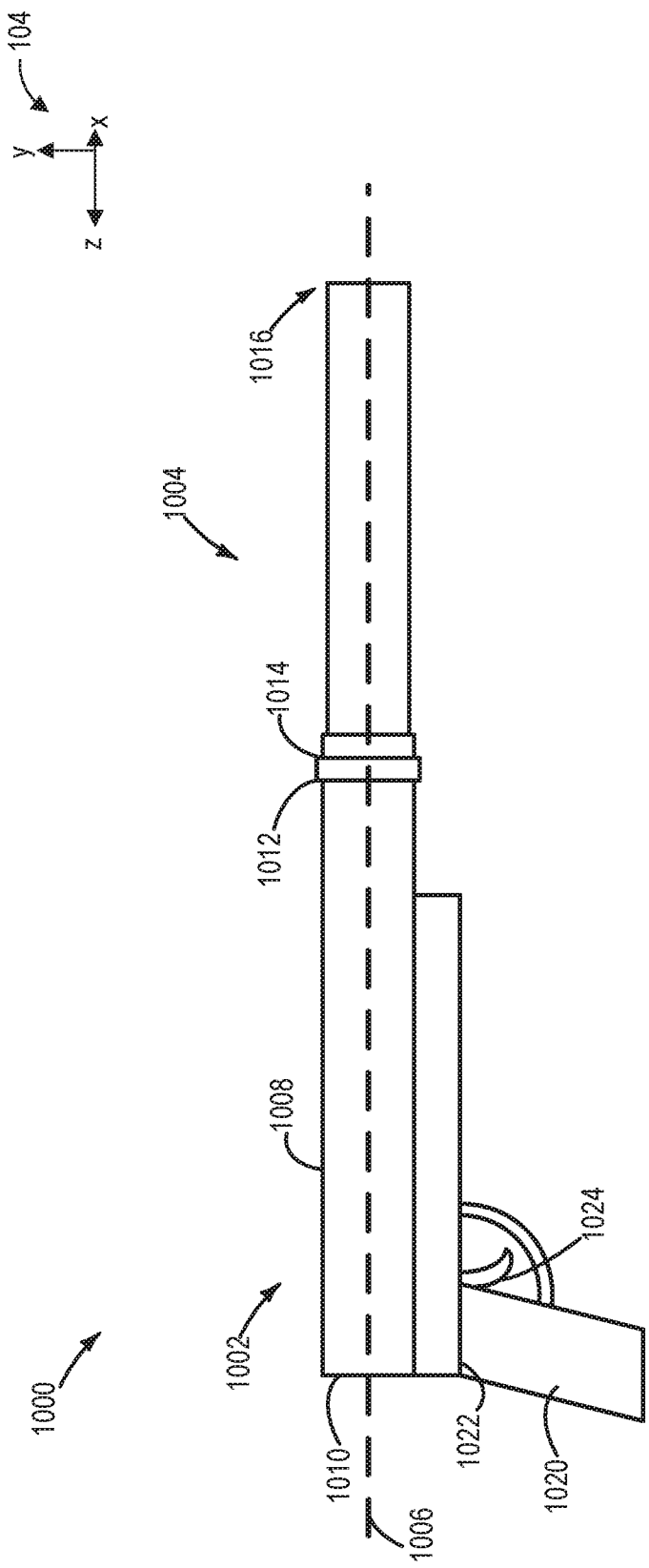
FIG. 10 shows a schematic of a firearm system including a firearm coupled to a suppressor.

A firearm suppressor may function to dampen noise associated with a firing of a projectile from a firearm. As the projectile passes through the firearm suppressor, attached to a barrel of the firearm as shown in FIG. 10, components of the firearm suppressor may dampen noise and absorb heat produced during a high energy release of gases captured behind the projectile. The firearm suppressor may be attached to a firearm to reduce noise generated during firing of the firearm. A coupling of a firearm suppressor to a firearm is illustrated in FIG. 10 by a firearm system 1000 comprising a firearm 1002 coupled at one end to a firearm suppressor 1004. A central axis 1006 of the firearm system 1000 is included. A set of reference axes 104 is provided for comparison of views shown, indicating a y-axis, an x-axis, and a z-axis. In some examples, the y-axis may be parallel with a vertical direction, the x-axis parallel with a horizontal direction, and the z-axis parallel with a transverse direction.

Firearm 1002 may include a first portion 1008, also a barrel 1008, aligned parallel to the central axis 1006 where a projectile may be loaded at a first end 1010 of the barrel 1008. The projectile may follow a trajectory through a length of the barrel 1008, along the central axis 1006 to exit the barrel 1008 of firearm 1002 at a second end 1012 (also a muzzle 1012). The muzzle 1012 of the barrel 1008 is coupled to an upstream, barrel end 1014 of the firearm suppressor 1004. The projectile may continuing travelling through the firearm suppressor 1004 along the central axis 1006 and exit the firearm system 1000 at a second, downstream end 1016 of the firearm suppressor 1004.

A second portion 1020 of firearm 1002 may be mated at a first end 1022 to the first end 1010 of the barrel 1008 of firearm 1002. The second portion 1020 may extend down, with respect to the y-axis, and away from the barrel 1008 in a direction that is angled relative to the y-axis. The second portion 1020 of firearm 1002 may include a trigger mechanism 1024, adapted to initiate the acceleration of the projectile through the barrel 1008 of firearm 1002 and the firearm suppressor 1004 when pressure is applied to the trigger mechanism 1024.

In this way, a firearm system 1000 may be operated by supporting the second portion 1020 of the firearm 1002, e.g. gripping the second portion 1020 of firearm 1002 in the hand of a user, and applying pressure, e.g. pulling, the trigger mechanism 1024. The projectile, originating at the first end 1010 of the barrel 1008 of firearm 1002, is launched in a direction along the central axis 1006. The noise associated with the release of the projectile may be suppressed as the projectile travels through the firearm suppressor 1004, thereby exerting a muffling effect on the sonic blast generated by the velocity of the projectile. In one example, the firearm 1002 may be a semi-automatic gun that utilizes at least a portion of exhaust gases released during firing to recharge a projectile chamber of the semi-automatic gun. In another example, firearm 1002 an automatic rifle. In yet another example of the firearm system 1000, firearm 1002 may be a hand gun, such as a pistol. It will be appreciated by those of ordinary skill in the art that there may be more examples of the firearm described above without departing from the scope of the present disclosure.

Turning now to FIG. 1, a first embodiment 100 of a suppressor 102 for a firearm is shown. The suppressor 102 is oriented so that a central axis 101 of the suppressor 102 is parallel with the y-axis, in an upright position. An exterior of the suppressor 102 is described in FIGS. 1 and 2 to illustrate the overall shape of the suppressor 102 and relative spatial positioning of interior components of the suppressor 102. The suppressor 102 has a central axis 101 and a direction of projectile travel through the suppressor 102 is indicated by arrow 103. Herein, a positioning of an element of the suppressor 102 relative to another along the central axis 101 may be described in reference to the direction of projectile travel. For example, a first component of the suppressor 102 that is farther along the direction of projectile travel than a second component may be referred to as being downstream of the second element. Conversely, the second component may be referred to as being upstream of the first component.

The suppressor 102 may comprise an elongate tubular outer housing 106 formed from a metal or metal alloy. The outer housing 106 is formed from a single unitary and continuous material without seams or joints. The suppressor 102 may have a downstream end 108, representing an end of the suppressor 102 that is distal to an attached firearm, and an upstream end 110, representing an end of the suppressor 102 that is proximate to an attached firearm.

The outer housing 106 comprises curved panels 112 that may extend along a length of the suppressor 102, the length parallel with the central axis 101, from the downstream end 108 to a merging region 114 at a point along the length of the suppressor 102. The merging region 114 may merge the curved panels 112 with a conical region 116 at the upstream end 110 of the suppressor 102. A geometry of the conical region 116 may differ from a portion of the outer housing 106 defined by the curved panels 112 in that the conical region 116 has an annular cross-section, taken in a direction perpendicular to the central axis 101, whereas the portion of the outer housing 106 comprising the curved panels 112 has a cross-section resembling a rounded square with curved corners. The merging region 114 is curved so that a midpoint 118 of the merging region 114 along a width 120 of each of the curved panels 112, the width perpendicular to the central axis 101, is closer to the upstream end 110 than a curved corner 122 of the merging region 114, the curved corner 122 being a region where one of the curved panels 112 intersects with another of the curved panels 112. The curved corner 122 may extend along an entire length of the curved panels 112, the length defined along the central axis 101.

The upstream end 110 of the outer housing 106 may include a set of recesses 124 in the conical region 116. The recesses 124 may be cut-outs in the outer housing 106 with two planar surfaces that intersect perpendicularly, the recesses 124 proximal to an inlet 126 of the suppressor 102. The recesses 124 may provide flat surfaces for coupling to a tool, such as a wrench, to secure the suppressor 102 to a barrel of a firearm at the inlet 126. The inlet 126 may be an opening in the upstream end 110 of the suppressor 102 that defines an entry point for a projectile ejected from the firearm to enter into the suppressor 102. The projectile may travel through the suppressor 102 along the central axis 101 and exit at the downstream end 108 of the suppressor 102.

The inlet 126 is viewed in greater detail in an isometric perspective view 200 of the suppressor 102 at FIG. 2. The suppressor 102 is shown with the central axis 101 oriented parallel with the z-axis, e.g., the suppressor 102 is positioned sideways relative to FIG. 1. In FIG. 2, the inlet 126 is circular and centered about the central axis 101. An inner surface 202 of the inlet 126 is smooth and curved and may include an inner lip 204. A diameter of the inner surface 202, measured perpendicular to the central axis 101, may be wider upstream of the inner lip 204 than the diameter of the inner surface 202 downstream of the inner lip 204. The inner surface 202 of the inlet 126 may extend downstream of the inner lip 204 along the central axis, and have a uniform diameter. A length of the inner surface 202 of the inlet 126 may be equal to a length of the conical region 116, with the lengths defined along the central axis 101.

Figure 3:
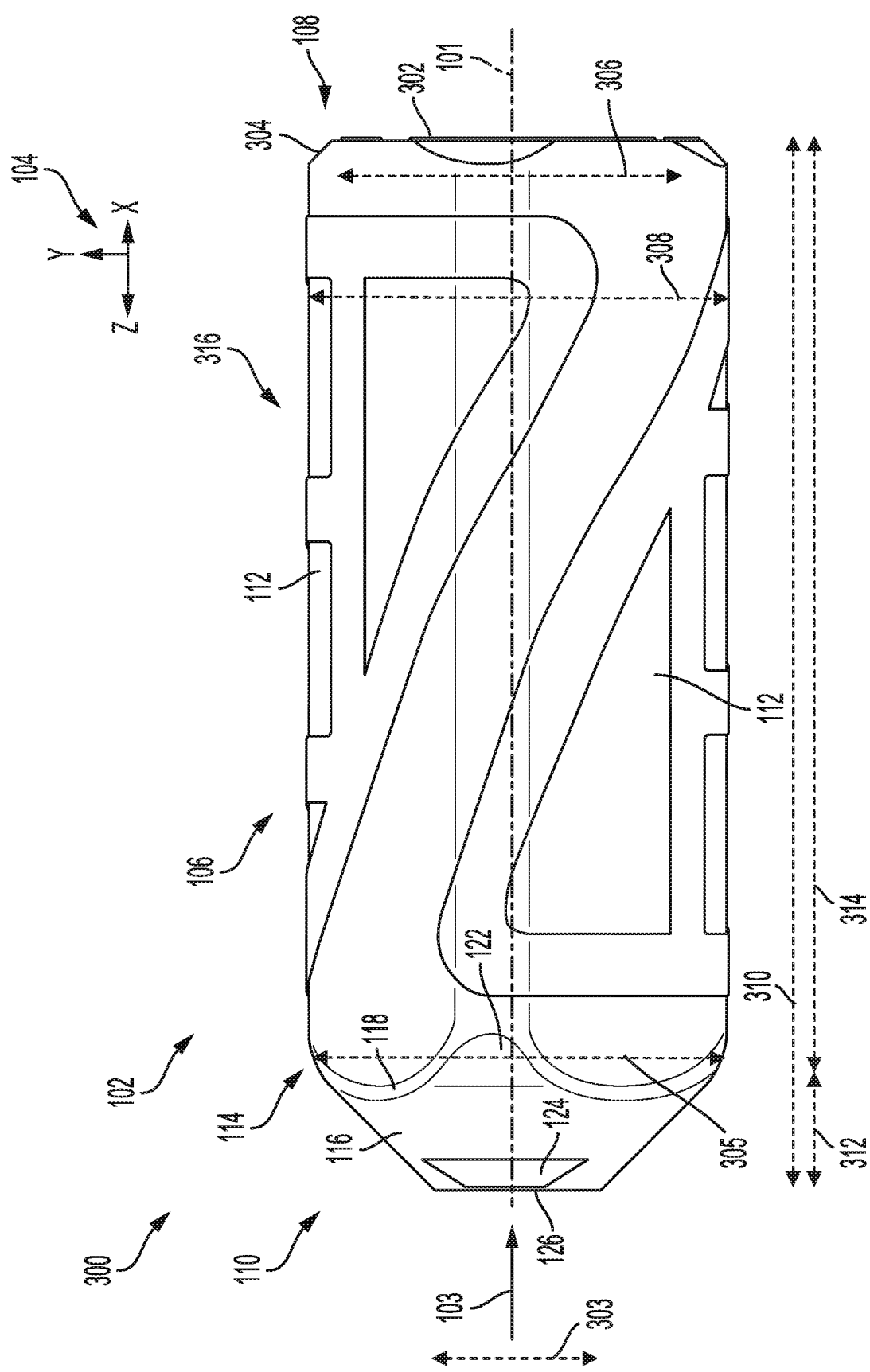
FIG. 3 shows the example suppressor from a side view.
Figure 4:
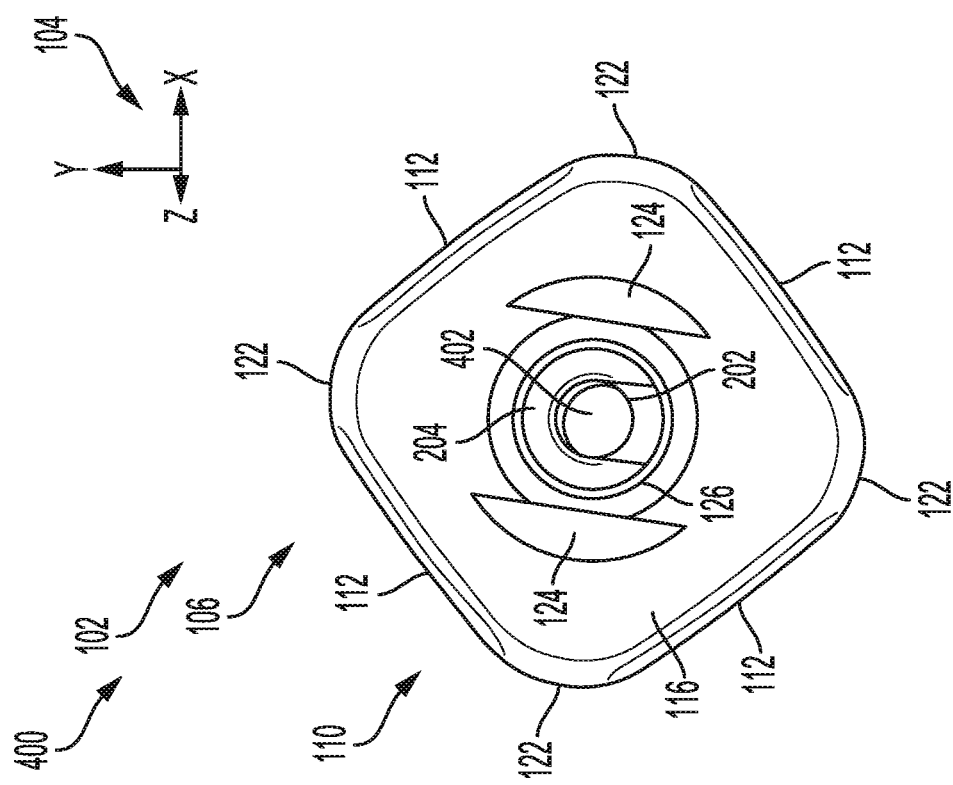
FIG. 4 shows the example suppressor from a view of a first end of the suppressor.

A side view 300 of the suppressor 102 of FIG. 3 illustrates a difference in geometry at the upstream end 110 compared to the downstream end 108. The upstream end 110 comprises the conical region 116, resulting in a tapering of the upstream end 110 towards the central axis 101 from the merging region 114 to the inlet 126 so that a diameter, taken perpendicular to the central axis 101, of the outer housing 106 at the inlet 126 is narrower than a diameter of the outer housing 106 at the merging region 114. In contrast, the downstream end 108 is blunt with an end wall 302 that is perpendicular to the central axis 101. A width 306 of the end wall 302, measured perpendicular to the central axis 101, may be similar or slightly smaller than a width 308 of the outer housing 106 in the portion comprising the curved panels 112, hereafter, a paneled section 316. The end wall 302 couples to the curved panels 112 and each curved corner 122 between the curved panels 112 at a rear coupling region 304 that has sloped sides, sloping inwards towards the central axis 101 from ends of the curved panels 112 to the end wall 302.

A length 310 of the outer housing 106 of the suppressor 102 may be greater than the width 308 of the outer housing 106. The length 310 of the outer housing 106 may be divided between a length 312 of the conical region 116 and a length 314 of the paneled section 316. The length 314 of the paneled section 316 may be longer than the length 312 of the conical region 116 by several times, such as eight to ten times longer. A larger portion of the length 310 of the outer housing 106, e.g., the length 314 of the paneled section 316, may be uniform in width 308 than a portion that tapers, e.g., the length 312 of the conical region 116.

The upstream end 110 and the downstream end 108 of the suppressor 102 may be viewed in greater detail at FIGS. 4-5. The outer housing 106 of the suppressor 102 has a rounded square shape with rounded corners when viewed from the front and rear, formed from four of the curved panels 112 with the curved corner 122 at each intersection of two of the curved panels 112. FIG. 4 shows an upstream view 400 from the upstream end 110 of the outer housing 106 of the suppressor 102. An aperture 402, also referred to as a projectile pathway 402 hereafter, extends as a through hole along the entire length 310 of the suppressor 102, as depicted at both FIGS. 4 and 5. The projectile pathway 402 begins at the inlet 126 of the upstream end 110 and terminates at an outlet 502 in the end wall 302 shown in a downstream view 500 of the suppressor 102 from the downstream end 108 in FIG. 5.

The end wall 302 may include apertures 504, or vents 504, that extend through the end wall 302. The vents 504 may have asymmetric shapes and may be openings to chambers within the interior of the suppressor 102 that will be discussed further below. The vents 504 may have an overall rectangular shape with one non-linear side. The positioning of the vents 504 in the end wall 302 may depend on the positioning of the chambers within the suppressor 102. As such, the arrangement of the vents 504 may be concentric about the outlet 502 and spaced at least a distance 506 away from the outlet 502.

Chambers arranged within the interior of the suppressor 102 are illustrated in a first cross-section 600 at FIG. 6. The cross-section 600 is taken along the y-x plane, perpendicular to the central axis 101 and along a portion of the length outer housing 106 comprising the curved panels 112. The cross-section 600 shows that the outer housing 106 is a thin shell surrounding a plurality of inner structures including a first exhaust gas chamber 601, a second exhaust gas chamber 602, a third exhaust gas chamber 603, and a fourth exhaust gas chamber 604 and baffle walls 605. Inner structures of the exhaust gas chambers may have thicknesses similar to the thickness of the outer housing 106.

The configurations of the inner structures of the first, second, and third exhaust gas chambers 601, 602, 603 may be identical while the fourth gas exhaust gas chamber 604 may be different. All of the first, second, third, and fourth exhaust gas chambers 601, 602, 603, 604 may have an overall rectangular cross-sectional geometry, taken along the y-x plane, with two diagonally slanted outer corners 611 in contact with and attached to the outer housing 106. Each gas chamber may extend along a portion of the length 314 of the paneled section 316, as shown in FIG. 3, of the suppressor 102, coupling to one of the vents 504 in the end wall 302 of the outer housing 106, as shown in FIG. 5. As well, each of the first, second, third, and fourth exhaust gas chambers 601, 602, 603, 604 may be spaced away from one another by triangular channels 608 but couple to one another at inner corners 613 of the exhaust gas chambers, the inner corners proximate to the central axis 101 relative to the outer corners 611. For example, the first exhaust gas chamber 601 may be connected to the second exhaust gas chamber 602 at one of the inner corners 613 on the right-hand side of the first exhaust gas chamber 601 and connected to the fourth exhaust gas chamber 604 at one of the inner corners 613 on the left-hand side of the first exhaust gas chamber 602.

Each of the exhaust gas chambers may be spaced away from the outer housing 106 by gaps 607 which may have semi-circular cross-sectional geometries. The triangular channels 608 and semi-circular gaps 607 may reduce thermal transfer from the exhaust gas chambers to the outer housing 106 of the suppressor 102 by insulating the exhaust gas chambers from the outer housing 106 with pockets of air.

The following description of aspects of the first exhaust gas chamber 601 may be similarly applied to the second and the third gas chambers 602, 603. The first exhaust gas chamber 601 has an outer boundary wall 606 separating an inner volume of the first exhaust gas chamber 601 from one of the gaps 607 between the first exhaust gas chamber 601 and the outer housing 106. The first exhaust gas chamber 601 also has two side walls 609 separating the first exhaust gas chamber 601 from the adjacent triangular channels 608 and an inner wall boundary 614 separating the first exhaust gas chamber 601 from the baffle walls 605. The inner volume of the first exhaust gas chamber 601 may include partitions 610 that divide the inner volume of the first exhaust gas chamber 601 into a plurality of semi-chambers 612. The semi-chambers 612 may be partially enclosed portions of the inner volume of the first exhaust gas chamber 601. The partitions 610 may be formed from two or more intersecting panels that are perpendicular to one another, forming U- or L-shaped structures. The semi-chambers 612 are not be distinctly sealed compartments, instead being fluidly coupled to each other through gaps in the partitions 610.

The first exhaust gas chamber 601 includes three partitions 610 and the inner boundary wall 614 extending across a width 616 of the first exhaust gas chamber 601. In contrast, the fourth exhaust gas chamber 604 has a non-linear inner boundary wall 618 and one U-shaped partition 620. The inner boundary wall 618 of the fourth exhaust gas chamber 604 may have a staggered geometry with five sections arranged perpendicular to adjacent sections. In addition, side sections 622 of the inner boundary wall 618 of the fourth exhaust gas chamber 604 may be double-walled.

The inner boundary wall 618 of the fourth exhaust gas chamber 604 may be continuous with the inner boundary wall 614 of the first, second, and third exhaust gas chambers 601, 602, 603. The fourth exhaust gas chamber 604 also has a plurality of semi-chambers 617 divided by the partition 620. The plurality of semi-chambers 617 of the fourth exhaust gas chamber 604 may be fluidly coupled to one another by gaps in the partition 620.

Figure 9:
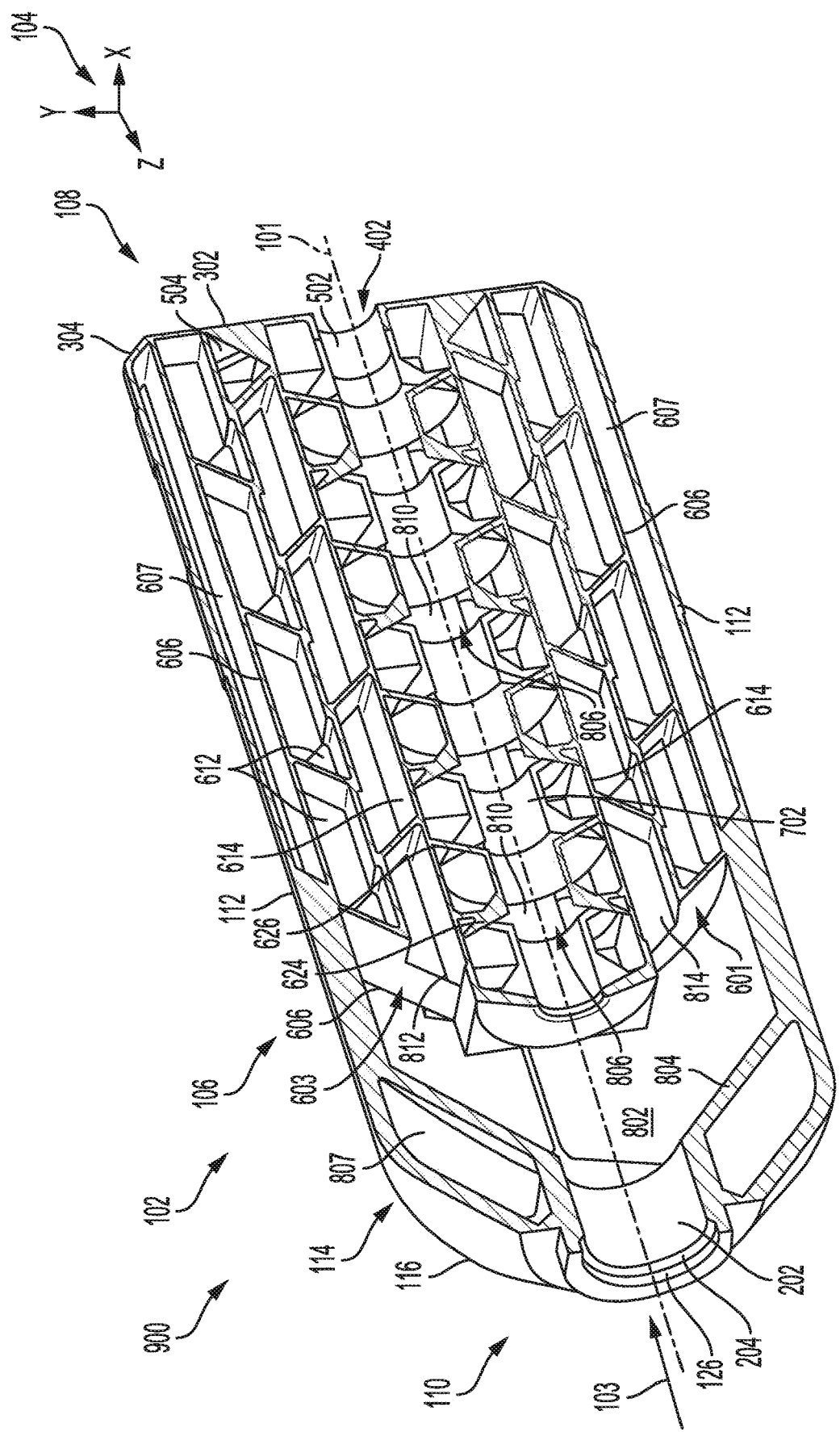
FIG. 9 shows an isometric perspective view of the second cross-section of the example suppressor.

The first through fourth exhaust gas chambers 601, 602, 603, 604 surround the baffle walls 605 which are centrally disposed in the interior of the suppressor 102, centered about the central axis 101, and arranged perpendicular to the central axis 101. The baffle walls 605 may circumferentially surround the projectile pathway 402 and each baffle wall of the baffle walls 605 may define an end of one of a plurality of baffle chambers. The plurality of baffle chambers may be aligned axially within the suppressor 102, as shown in FIGS. 8-9, and surround the projectile pathway 402 along at least a portion of the length 310 of the outer housing 106 of the suppressor 102. The baffle walls 605 may be continuous with and coupled to an outer edge of either a first shell 624 or a second shell 626. Each of the first shell 624 and second shell 626 may be semi-conical, e.g., half of a cone, but curving in opposite directions along the z-axis. For example, the first shell 624 may be concave with respect to the y-x plane while the second shell 626 may be convex. The curvatures of the first shell 624 and second shell 626 may be viewed from a different perspective at FIG. 7.

In FIG. 7, an isometric perspective view 700 is shown of the first cross-section 600 of the suppressor 102 depicted in FIG. 6. Note that the suppressor 102 is oriented differently than shown in FIG. 6, as indicated by the reference axes 104. The first shell 624 of one of the baffle walls 605 may be concave, with respect to the y-x plane, and coupled to a first aperture wall 702. The first aperture wall 702 may encircle the projectile pathway 402, extending along the central axis 101 from an inner edge, e.g., proximate to the projectile pathway 402, of the first shell 624 in a downstream direction relative to the direction of projectile travel as indicated by arrow 103. The second shell 626, immediately adjacent to the first shell 624 along a linear edge 708 of the first shell and a linear edge 710 of the second shell 626, may be convex with respect to the y-x plane and coupled at an inner edge to a second aperture wall 704 that extends along the central axis 101 in an opposite direction from the first aperture wall 702, opposite of the direction of projectile travel. The linear edge 708 of the first shell 624 may intersect the linear edge 710 of the second shell 626 so that there may be points of contact between the linear edge 708 of the first shell 624 and the linear edge 710 of the second shell 626.

A positioning of the first shell 624 and the second shell 626 around the projectile pathway 402 may be maintained by supporting ridges 706. The supporting ridges may be attached to the inner boundary wall 614 of each of the exhaust gas chambers, providing structural support to the first shell 624 and the second shell 626 and to the baffle walls 605.

A second cross-section 800 of the suppressor 102 is shown at FIG. 8, the second cross-section taken from along the y-x plane and along the central axis 101. The direction of projectile travel, indicated by arrow 103, through the projectile pathway 402 along the central axis 101 may extend from the inlet 126 to the outlet 502 of the suppressor 102. Within the interior of the outer housing 106, a first chamber 802 may be arranged in the suppressor 102 at the upstream end 110 of the outer housing 106 immediately adjacent to and downstream of the inlet 126. A volume of the first chamber 802 may be a fraction of a total inner volume of the outer housing 106 of the suppressor 102 that is less than 50%, such as 20% or 30%. A set of rafters 804 may be coupled at a first end 803 of the rafters to a downstream edge of the inner surface 204, protruding into the first chamber 802. The set of rafters 804 extend radially outwards away from the central axis 101 to connect to an inner wall 807 of the outer housing 106 at a second end 805 of the set of rafters 804. A width of the set of rafters 804 may taper to be narrower at the second end 805 than the first end 803.

Baffle chambers 806 may be arranged downstream of the first chamber 802, arranged in line along the central axis 101. The first, second, third, and fourth exhaust gas chambers 601, 602, 603, 604 (only 601 and 603 are shown at FIG. 8) may extend along the length 310 of the outer housing 106 of the suppressor 102, downstream of the first chamber 802 and surrounding the baffle chambers 806. The baffle chambers 806 comprise a plurality of identical compartments aligned along the central axis 101, each of the baffle chambers 806 separated from adjacent baffle chambers by the first aperture wall 702 (as well as the second aperture wall 704, shown in FIG. 7). The second cross-section 800 is oriented so that a first half of the suppressor 102 is depicted with each of the baffle chambers 806 arranged with the second shell 626 at an upstream end and the first shell 624 at a downstream end of each baffle chamber. The second shell 626 and the first shell 624 are shown alternating along the central axis 101 with the first aperture wall 702 coupled to a downstream, inner edge of the first shell 624. The first aperture wall 702 circumferentially surrounds the projectile pathway 402. However, it will be appreciated that a second half of the suppressor 102 that is not shown in FIG. 8 comprises an oppositely alternating arrangement of the first shell 624 and the second shell 626 relative to the arrangement of the first half shown in FIG. 8 so that, for example, the second shells 626 of the second half of the suppressor 102 are in contact with the first shells 624 of the first half of the suppressor 102 at points along side edges 809 (and along the linear edge 708 of the first shell and the linear edge 710 of the second shell, as shown in FIG. 7) of the shells. Similarly, the first shells 624 of the second half are in contact with the second shells 626 of the first half at points along the side edges 809. Furthermore, the second aperture wall 704 of one of the baffle chambers 806 may be in edge sharing contact with the first aperture wall 702 of an immediately upstream baffle chamber of the baffle chambers 806, the shared edge aligned with the central axis 101.

As described above, each of the baffle chambers 806 may be defined by the second shell 626 at an upstream end and the first shell 624 at the downstream end. A rear-facing surface of the second shell 626 may be configured with ribs 808 extending from the rear-facing surface of the second shell 626 to a side wall 810 of each of the baffle chambers 806, along the central axis 101 but angled relative to the central axis 101. For example, a downstream end of each of the ribs 808 may be angled away from the central axis relative to an upstream end of the each of the ribs 808. The ribs 808 may vary in length, defined along the central axis 101, but may have similar thicknesses, measured perpendicular to the central axis 101 as well as triangular geometries, with respect to the central axis 101. The first aperture wall 702, disposed between each of the baffle chambers 806, may provide intermittent smooth inner conduits with a uniform diameter through which the projectile may pass.

The baffle chambers 806 may be circumferentially surrounded by the first, second, third, and fourth exhaust gas chambers 601, 602, 603, 604. The first exhaust gas chamber 601 and third exhaust gas chamber 603, shown at FIG. 8, may be defined by areas between the outer boundary wall 606 and the inner boundary wall 614, below and above the central axis 101, respectively. The outer boundary wall 606 and inner boundary wall 614 may be continuous around the central axis, as shown FIGS. 6 and 7. The first exhaust gas chamber 601 and third exhaust gas chamber 603 are spaced away from the outer housing 106 by the gaps 607. An upstream opening 812 of the first exhaust gas chamber opening is arranged at an upstream end of the first exhaust gas chamber 601 and fluidly couples an interior volume of the first exhaust gas chamber 601 to the first chamber 802 of the suppressor 102. Similarly, an upstream opening 814 of the third exhaust gas chamber opening is arranged at an upstream end of the third exhaust gas chamber 603, fluidly coupling an interior volume of the third exhaust gas chamber 603 to the first chamber 802.

The inner volumes of the first exhaust gas chamber 601 and the third exhaust gas chamber 603 may be divided into the semi-chambers 612 by the partitions 610 which may have triangular or pentagonal shapes along the y-z plane compared to the rectangular shapes shown in FIGS. 6-7 along the y-z plane. The partitions 610 may be partial walls between the semi-chambers 612 that do not seal the semi-chambers 612. Thus, the semi-chambers 612 of the first exhaust gas chamber 601 are all fluidly coupled, creating a continuous but non-linear, tortured pathway for exhaust gas flow. Similarly, the semi-chambers 612 of the third exhaust gas chamber 603 may be divided by the partitions 610 but remain fluidly coupled to one another and form a tortured exhaust gas flow path. The first and third gas chambers 601, 603 may also each be fluidly coupled to one of the vents 504 positioned in the end wall 302 of the outer housing 206, as shown in FIG. 5.

An isometric perspective view 900 of the second cross-section 800 of the suppressor 102 shown in FIG. 8 is illustrated at FIG. 9. The isometric perspective view 900 shows depths of the semi-chambers 612 of the first exhaust gas chamber 601 and the third exhaust gas chamber 603, measured along the x-axis, the depths of the semi-chambers 612 extending to the outer boundary wall 606. As well, positioning of the first and third exhaust gas chambers 601, 603 with respect to the baffle chambers 806 around the central axis 101 are illustrated, the positioning also shown in the isometric perspective view 700 of the first cross-section of FIG. 7.

A semi-cylindrical shape, e.g., half of a cylinder, of the first aperture wall 702 is depicted in FIG. 9, arranged between each of the baffle chambers 806. A diameter of the projectile pathway 402, the diameter perpendicular to the central axis 101, may be uniform and narrower through sections surrounded by the first aperture wall 702 than through sections included in the baffle chambers 806. Coupling of the third exhaust gas chamber 603 to one of the vents 504 in the end wall 302 of the outer housing 206 is shown in FIG. 9. Gas flowing into the suppressor 102 in the direction indicated by arrow 103 may pass through the first chamber 802 and enter the third exhaust gas chamber 603 through the upstream opening 814 of the third exhaust gas chamber 603 and flow through the semi-chambers 612 of the third exhaust gas chamber 603. The exhaust gas may exit the third exhaust gas chamber 603 through one of the vents 504 in the end wall 302, a velocity of the exhaust gas exiting the suppressor 102 at the vent lower than a velocity of the exhaust gas at the inlet 126 of the suppressor 102. Exhaust gas may similarly flow through each of the first exhaust gas chamber 601, the second exhaust gas chamber 602, and the fourth exhaust gas chamber 604.

In this way, the suppressor 102 may effectively dampen a sound produced by combustion in a firearm, such as the firearm 1002 of FIG. 10, the combustion discharging a projectile from the firearm. As the projectile enters the suppressor 102, coupled to a barrel of the firearm, the projectile pathway 402 of the suppressor 102 provides an unimpeded route for projectile travel that does not adversely affect an acceleration of the projectile. As the projectile is discharged, exhaust gases may be generated that accompany the projectile into the suppressor 102. As the hot exhaust gases enter the suppressor 102, the exhaust gases may expand within the first chamber 802 of the suppressor 102. Expansion, as well as forward momentum, of the exhaust gases, compels at least a portion of the exhaust gases to flow through each of the exhaust gas chambers, e.g., the first exhaust gas chamber 601, the second exhaust gas chamber 602, the third exhaust gas chamber 603, and the fourth exhaust gas chamber 604, around the projectile pathway 402, the projectile pathway 402 isolated from the surrounding exhaust gas chambers by the inner boundary wall 614.

A portion of the exhaust gases may flow through the central projectile pathway 402 and may come into contact with the first shell 624 and the second shell 626 of the baffle chambers 806 aligned along the projectile pathway 402. The geometry, e.g., curved conical shapes, of the first shell 624 and the second shell 626 may deflect the exhaust gases, decreasing a velocity of the portion of the exhaust gases travelling along the projectile pathway 402.

The portion of the exhaust gases flowing through the exhaust gas chambers may be hindered by the arrangement of the partitions 610 dividing the inner volumes of the exhaust gas chambers into fluidly coupled semi-chambers 612. The positioning of the partitions 610 forces the exhaust gases to follow a twisting, non-linear path, reducing a linear velocity of the exhaust gases through the exhaust gas chambers. Deceleration of the exhaust gases through both the exhaust gas chambers and the projectile pathway 402 reduces a decibel level of sound produced by explosive projectile discharge.

By configuring the suppressor 102 with more than one exhaust gas chamber, each exhaust gas chamber coupled to one of the vents 504, an internal pressure of the suppressor 102 that rises due to explosive projectile discharge in the firearm may be quickly reduced to ambient pressure. In a semi-automatic or automatic self-loading firearm, faster and more reliable reloading of the projectile may be achieved by more rapid dissipation of pressure from the suppressor 102. Additionally, by configuring the exhaust gas chambers to be spaced away from one another and away from the outer housing, except at corners of the exhaust gas chambers where the exhaust gas chambers may be connected to the outer housing, heat transfer from the exhaust gas chambers to the outer housing may be minimized, suppressing a mirage effect produced by a heat of combustion that may otherwise obstruct an operator's vision.

Furthermore, a geometry of the suppressor may be adapted to allow fabrication of the entire suppressor as a unitary, continuous structure. Inner components of the suppressor may be positioned so that no free-floating elements are included and all components are continuous with surrounding components via points of contact. The suppressor may thus be manufactured by 3D printing (e.g. selective laser melting (SLM), fused deposition modeling (FDM), sterolithography (SLA) and laminated object manufacturing (LOM)), allowing the suppressor to be produced inclusive of all of the above described internal components. The 3D printing process may yield a single unitary suppressor devoid of welds, fittings, threads, seams, gaps, union junctions, or any other adhesive properties between the outer housing, the exhaust gas chambers, and baffle chambers other than an internal strength of the printed material itself. For example, the suppressor including the exhaust gas chambers and baffle chambers may be printed in one continuous process, so long as they are made of the same material, such as Inconel (an alloy of nickel containing chromium and iron, which is resistant to corrosion at high temperatures). As such, the outer housing, the exhaust gas chambers and baffle chambers of the suppressor may be integrated with one another as one continuous piece.

In other examples, the suppressor may be fabricated by other methods such as casting, molding, and other types of additive manufacturing. However, by adapting the suppressor to be entirely formed as a single structure by 3D printing, a speed of manufacture may be greatly reduced as well as manufacturing costs. The geometry of suppressor may be readily modified and tuned according to a specific type of firearm or effects of the suppressor may be adjusted. For example, the suppressor may be printed with more baffle chambers, more exhaust gas chambers and/or more partitions in the exhaust gas chambers than the suppressor shown in FIG. 1-9 to increase a noise-suppressing effect of the suppressor. As another example, the suppressor may be printed with larger gaps between the exhaust gas chambers and the outer housing to further reduce heat transfer to the outer housing. As well, 3D printing may be used to manufacture the suppressor from a variety of printable materials that may be chosen based on properties of the material, such as heat tolerance, durability, weight, etc.

It will be understood that the figures are provided solely for illustrative purposes and the embodiments depicted are not to be viewed in a limiting sense. From the above description, it can be understood that the energy suppressor and/or combination of the energy suppressor and firearm disclosed herein and the methods of making them have several advantages, such as: (1) reducing the time required to achieve a pressure reduction of the exhaust gases of the firearm thereby avoiding mechanical malfunction of autoloading firearm; (2) reducing the mirage effect by minimizing the thermal transfer from the baffle exhaust gas tubes to the outer wall of the suppressor; (3) increasing accuracy and reliability; (4) aiding in the dissipation of heat and reducing the tendency of the energy suppressor to overheat; (5) reducing the sound signature of the firearm during operation; and (6) reliable and predictable manufacturing with desirable characteristics in an economical manner.

It is further understood that the firearm sound suppressor described and illustrated herein represents only example embodiments. It is appreciated by those skilled in the art that various changes and additions can be made to such firearm sound suppressor without departing from the spirit and scope of this disclosure. For example, the firearm sound suppressor could be constructed from lightweight and durable materials not described.

As used herein, an element or step recited in the singular and then proceeded with the word "a" or "an" should be understood as not excluding the plural of said elements or steps, unless such exclusion is explicitly stated. Furthermore, references to "one embodiment" of the present subject matter are not intended to be interpreted as excluding the existence of additional embodiments that also incorporate the recited features. Moreover, unless explicitly stated to the contrary, embodiments, "comprising," "including," or "having" an element or a plurality of elements having a particular property may include additional such elements not having that property. The terms "including" and "in which" are used as the plain-language equivalents to the respective terms "comprising" and "wherein." Moreover, the terms "first," "second," and "third," etc. are used merely as labels, and are not intended to impose numerical requirements or a particular positional order on their objects.

This written description uses examples to disclose the invention, including best mode, and also to enable a person of ordinary skill in the relevant art to practice the invention, including making and using any devices or systems and performing any incorporated methods.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and sub-combinations of the various features, functions, acts, and/or properties disclosed herein, as well as any and all equivalents thereof.

In one representation, a suppressor is provided formed of a unitary material, such as via 3D printing. The suppressor may include one or more structural features to internally route gases, in addition to one or more baffles. For example, to mitigate the issues related to excess heat build-up, exhaust gas chambers may be positioned longitudinally and with central axes in parallel with a barrel of the firearm. In one example, the tubes are not tangent with or directly touching the inside of the outer wall of the suppressor, nor are they directly touching each other. The plurality of exhaust gas chambers may instead be contained within internal tubes that surround a central set of baffle chambers arranged along the longitudinal length of the suppressors' inner body wall.

It should be appreciated that while the suppressor may be unitary in its construction, and thus in a sense virtually all of its components could be said to be in contact with one another, the terms used herein are used to refer to a more proper understanding of the term that is not so broad as to mean simply that the various parts are connected or contacting through a circuitous route because a single unitary material forms the suppressor.

The invention claimed is:

1. A sound suppressor comprising:
   an outer housing;
   gaps positioned between the outer housing and outer boundary walls and the gaps forming at least one air cavity separated from exhaust gas chambers;
   the exhaust gas chambers within the outer boundary walls;
   inner boundary walls separating the exhaust gas chambers from baffle chambers; and
   the baffle chambers positioned within and surrounded by the inner boundary walls and the exhaust gas chambers;
   wherein the outer housing, exhaust gas chambers, and baffle chambers are 3D printed and integrally formed.

2. The sound suppressor of claim 1, wherein the sound suppressor is formed from a single, unitary material and wherein the outer housing, exhaust gas chambers, and baffle chambers form a continuous integrated structure.

3. The sound suppressor of claim 1, wherein the outer housing includes a first portion formed from plurality of curved panels, the plurality of curved panels coupled to one another at rounded corners of the outer housing that extend along a length of the plurality of curved panels, the length aligned with a central axis of the sound suppressor.

4. The sound suppressor of claim 3, wherein the first portion has a uniform diameter along the length of the first portion, and the diameter perpendicular to the length.

5. The sound suppressor of claim 4, wherein the first portion extends from a mid-point along a length of the suppressor to a downstream end of the sound suppressor, and the downstream end relative to a direction of projectile travel through the sound suppressor.

6. The sound suppressor of claim 5, wherein the outer housing has a second portion that is conically-shaped and extends from an upstream end of the sound suppressor to the mid-point of the sound suppressor, the upstream end opposite of the downstream end, and the second portion of the outer housing coupled to the first portion at the mid-point.

7. The sound suppressor of claim 6, wherein a diameter of the second portion increases from the upstream end to the mid-point, and the diameter of the second portion at the mid-point equal to the diameter of the first portion.

8. The sound suppressor of claim 5, wherein the exhaust gas chambers extend along the length of the first portion of the outer housing, wherein the exhaust gas chambers have partitions within an inner volume of each of the exhaust chambers that divides the inner volume of each of the exhaust chambers in semi-chambers, and each semi-chamber fluidly coupled to adjacent semi-chambers.

9. The sound suppressor of claim 8, wherein the semi-chambers have triangular and/or pentagonal cross-sections when the cross-sections are taken along a plane parallel with the central axis and rectangular cross-sections when the cross-sections are taken along a plane perpendicular to the central axis.

10. The sound suppressor of claim 9, wherein each of the exhaust gas chambers is coupled to a separate vent in an end wall at the downstream end of the outer housing, and the end wall aligned perpendicular to the central axis of the sound suppressor.

11. The sound suppressor of claim 10, wherein each exhaust gas chamber is a separate and discrete exhaust passage from the other exhaust gas chambers and the baffle chambers, a path of gas flow through each of the exhaust gas chambers begins at an inlet opening in an upstream end of the sound suppressor and terminates at the vent in the end wall, and the path of gas flow has a twisting, non-linear geometry.

12. The sound suppressor of claim 11, wherein each of the exhaust gas chambers is spaced away from the outer housing of the sound suppressor along a planar side of each of the exhaust chambers and connected to the outer housing along outer corners of each of the plurality of exhaust gas chambers.

13. The sound suppressor of claim 1, wherein the baffle chambers are aligned linearly along a central axis of the sound suppressor surrounding a path of projectile travel through the sounds suppressor.

14. The sound suppressor of claim 13, wherein each of the baffle chambers includes a first, upstream wall and a second, downstream wall, and both the first and second walls are shaped as semi-circular shells that curve in opposite directions along the central axis.

15. A firearm system comprising,
    a firearm including a barrel; and
    a suppressor coupled to the barrel, the suppressor including:
      a unitary, single-piece body having:
        a plurality of baffle chambers encapsulating a projectile pathway extending through a central axis of the body,
        a plurality of exhaust gas chambers surrounding the plurality of baffle chambers and separated from the plurality of baffle chambers by inner boundary walls,
        an outer housing enclosing the plurality of exhaust gas chambers and the plurality of baffle chambers,
        outer boundary walls separating the outer housing and the plurality of exhaust gas chambers, and
        gaps formed between the outer boundary walls and the outer housing, and the gaps forming at least one air cavity separated from the exhaust gas chambers.

16. The firearm system of claim 15, wherein a first inner chamber is arranged at an upstream end of the suppressor within the outer housing, and the first inner chamber positioned upstream of the plurality of exhaust gas chambers and the plurality of baffle chambers.

17. The suppressor of claim 16, wherein the plurality of exhaust gas chambers have openings at upstream ends of each of the exhaust gas chambers that fluidly couple inner volumes of each of the plurality of exhaust gas chambers to the first inner chamber and have openings in an end wall at a downstream end of the outer housing.

18. The suppressor of claim 15, wherein each of the plurality of baffle chambers have two semi-conical shells with opposite curvatures and each of the two semi-conical shells has an aperture wall that encircles the projectile pathway, a first aperture wall extending downstream from a first semi-conical shell and another aperture wall extending upstream from a second semi-conical shell, and the first and second semi-conical shell have opposite curvatures.

19. A sound suppressor comprising;
- an elongate housing with a central axis aligned with a length of the housing;
- gaps between the elongate housing and outer boundary walls, and the gaps forming at least one air cavity separated from a plurality of exhaust gas chambers;
- the plurality of exhaust gas chambers positioned within the outer boundary walls, and extending along a portion of the length of the housing, and spaced away from the housing;
- inner boundary walls within the plurality of exhaust gas chambers; and
- a plurality of baffle chambers positioned within the inner boundary walls, surrounded by the plurality of exhaust gas chambers, and aligned along the central axis,
- wherein the sound suppressor is 3D printed as a single, continuous, unitary structure.

* * * * *